United States Patent [19]

Colwell

[11] 4,344,825

[45] Aug. 17, 1982

[54] METHODS AND APPARATUS FOR SEPARATING CLEANING SOLVENTS FROM ROSIN FLUX AND OTHER CONTAMINANTS

[75] Inventor: Darrel R. Colwell, Oklahoma City, Okla.

[73] Assignee: Western Electric Company, Inc., New York, N.Y.

[21] Appl. No.: 256,427

[22] Filed: Apr. 22, 1981

[51] Int. Cl.³ .............................................. B01D 3/02
[52] U.S. Cl. ...................................... 203/1; 202/173; 203/71
[58] Field of Search ............... 202/173, 174, 206, 165, 202/166, 175, 172, 176, 182, 199, 202; 196/98, 106, 111, 155, 115, 132, 133; 203/71, 78, 1, 84, 94, 98, 4, 75, 82, 86, 93, 99, DIG. 11

[56] References Cited

U.S. PATENT DOCUMENTS 3,156,627 11/1964 Ester .................................... 203/84
3,313,724 4/1967 Kniel ..................................... 203/84

Primary Examiner—Frank Sever
Attorney, Agent, or Firm—R. P. Miller

[57] ABSTRACT

A contaminated solvent is first distilled in a distillation chamber (12) to drive off a substantial portion of the solvent which is condensed and recovered leaving a residual slurry (18) consisting of some solvent and the contaminants. A metering device (21) is cyclically operated to transfer precise amounts of slurry to a second distillation chamber where the slurry is deposited in an annular trough (26) formed in a heat plate (25). A spreader including a number of blades (27) moves the deposited slurry charge along the trough to an exit opening (44). The residual solvent in the slurry charge is vaporized, condensed and fed back into the first chamber (12). The remainder of the charge is exited through the trough opening (44) into a collection barrel (50) which is vented to pass back any solvent vapors to the second distillation chamber.

18 Claims, 9 Drawing Figures

METHODS AND APPARATUS FOR SEPARATING CLEANING SOLVENTS FROM ROSIN FLUX AND OTHER CONTAMINANTS

FIELD OF THE INVENTION

This invention relates to methods and apparatus for separating impurities, such as rosin, from a contaminated solvent and, more particularly, to a distillation system wherein a liquid is initially distilled in a first chamber and the residue passed in metered amounts into a second distillation chamber whereat the residue is further distilled and the distillate is returned to the first distillation chamber.

BACKGROUND OF THE INVENTION

There are great numbers of industrial processes requiring that manufactured parts be cleaned by application of chemical solvents either by immersing in a solvent bath or by spraying the parts with a solvent. After a period of time the solvent due to repetitive use becomes spent in that it is contaminated with debris, absorbed chemicals and other solvent deteriorating agents. For example, in the manufacture of printed circuit boards, electrical components are mounted on the boards with terminal leads extending through the board into proximity with circuit patterns formed on the underside of the board. In order to obtain electrical connections between the terminals and the circuit paths, the boards are subject to mass soldering operations. In mass soldering the usual practice is to move the board to advance the terminals through a flux applying station whereafter the boards are moved to advance the terminals through a solder wave. Following the soldering operation, it is necessary that the boards be cleaned with a solvent to remove the residual flux because the flux often contains conductive materials that may bridge conductive paths resulting in shorted circuits.

This solvent cleaning operation involves either immersion of the board in a solvent or the spraying of the soldered terminals with a solvent. In either case, the solvent becomes contaminated with dissolved flux and other debris picked up from the circuit boards. The solvent is relatively expensive and, hence, it is common practice to distill the solvent in order to recover as much of the solvent as possible by separating out the residue dissolved flux and other impurities. The usual salvage, distillation process results in reclaiming a substantial portion of the solvent, but a significant amount of residue slurry is produced which is a mixture of unvaporized solvent, flux, other chemicals, debris of various types, such as dirt, solder slivers, circuit board particles, etc. This residue presents a problem in that it must be economically disposed of without any adverse environmental effects. In view of the mass and chemical composition of the residue, which is in the form of a slurry, the safe disposal results in a rather expensive operation.

There are numerous distillation systems for separating contaminants from a solution. Many of these processes contemplate introducing a distilland onto a vaporized surface, such as a heated plate mounted in a distillation chamber which may be rotated to centrifugally distribute the distilland while it is vaporized. In other installations a scraper may pass over a stationary heated plate to spread the distilland and, hence, speed up the vaporization process. The vapors are usually condensed on a cooling surface provided in or by the upper portion of the distillation chamber. The condensed vapors or distillate run down the sides of the chamber into peripheral collecting troughs and then out of the chamber into a suitable container.

In U.S. Pat. No. 3,347,754 to W. L. Thomas issued Oct. 17, 1967, there is shown a high vacuum distillation system wherein the distilland is deposited at the center of a rotating plate which functions to centrifugally distribute the distilland relative to a number of condensing zones. The distilland is vaporized and condensed a number of times as it moves to the periphery of the rotating plate. The unvaporized residue passes through ducts formed in the plate and is collected and fed into a residue receiver.

In another system, such as shown in U.S. Pat. No. 2,818,373 to C. Ockrent issued Dec. 23, 1957, the distilland is fed onto a stationary heated plate whereafter a scraper spreads the distilland during vaporization. Again the vapors are condensed in the upper portion of the distillation chamber and collected in an inner circumferential trough and then exited from the chamber into a suitable container.

SUMMARY OF THE INVENTION

This invention contemplates, among other things, a process and system for recovering a solvent from a mixture of the solvent and contaminants wherein the contaminated solvent is transferred through a number of solvent recovery vessels or chambers and the recovered solvent in each chamber is fed back into a preceding chamber or vessel.

More particularly, the contaminated solvent is received from a solvent applying device, such as a spray or tank, into a first still where the solvent is vaporized, condensed and returned to the utilization device. The non-vaporized solvent mix accumulates in the bottom of the first still and is exited through a conduit to a metering pump feed device. This device is cyclically operated to advance metered charges of the slurry into a second still and onto a heated plate which is provided with a trough to receive the metered charge of slurry. A spreader having a number of blades to define a succession of compartments of equal volumes which are moved through the trough to distribute each metered charge over the plate. As the charge is moved over the plate, the residual solvent is vaporized or reboiled, condensed and fed into the first distillation chamber. The remainder of the charge, which is substantially a mix of contaminants, such as rosin flux, circuit board particles, metallic slivers and other chemical and dirt particles, is pushed through an opening in the plate into a heated conduit running to a receiving barrel or drum. The barrel is vented through a pipe back into the second distillation chamber so that any solvent vapors passed to or generated in the receiving barral are not retained in the barrel. The receiving barrel accumulates material which is almost 100% waste, free of any solvent. When cooled, the waste is substantially solid material of minimum volume which can be easily disposed of.

DESCRIPTION OF THE DRAWINGS

Other features and advantages of the invention will be apparent upon consideration of the following detailed description when considered in conjunction with the drawings wherein.

DETAILED DESCRIPTION

Figure 1:
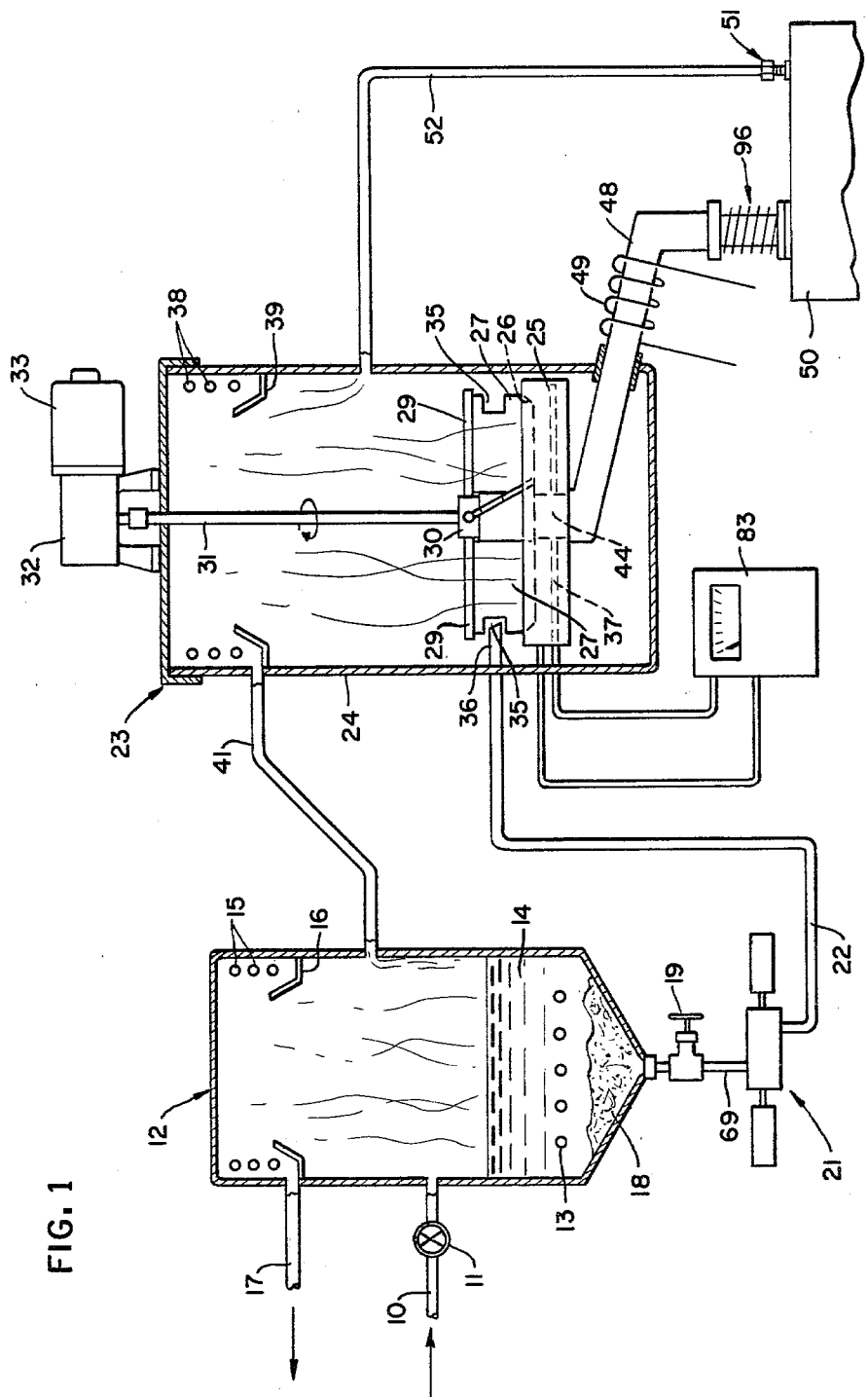
FIG. 1 is an overall schematic view of a distillation system partially cut away to illustrate the arrangement of a number of distillation chambers interconnected in accordance with the principles of the invention.

The invention illustrated in the drawing will be described with respect to the treatment of a contaminant solvent of the type used to clean printed circuit boards following a fluxing and soldering operation in which it is desired to remove residual flux and other foreign matter from the circuit board. It will be understood, however, that many other vaporizable liquids may be treated by the process and the apparatus of the present invention. In cleaning printed circuit boards, many types of fluid solvent cleaners have been found to be satisfactory, for example, trichloroethylene, perchloroethylene, trichloroethane 1-1-1 and trichlorotrifluoroethane of the type sold under the trademark "Freon" by the E. I. DuPont de Nemours and Co.

During the circuit board cleaning operation which may be accomplished by part immersion or part spraying, the solvent becomes contaminated with liquid or burnt flux clinging to the circuit board. In addition, other contaminants are picked up by the solvent, such as chemicals, debris particles of plastic and metal from the circuit board, grease and dirt. After a time the solvent is degraded to such an extent that it can no longer be utilized as a cleaner. Inasmuch as the solvent is rather expensive it has been the usual practice to place the solvent in a still where the solvent is vaporized, condensed and collected for reuse. The remaining slurry which has been found to be quite bulky is then disposed of by a professional scavenger. This is a rather expensive operation inasmuch as the contaminated slurry, often, must be treated to avoid environmental problems.

Referring to FIG. 1, contaminated solvent is flowed from a printed circuit board cleaning facility through a pipe 10 and a valve 11 as a distilland into a first distillation chamber 12 which is of commercial manufacture and is of the type usually used to treat contaminated printed circuit board solvent cleaners. The still 12 is heated by heating elements 13. The liquid solvent cleaner 14 is vaporized so that the fumes rise and are condensed by cooling coils 15 situated near the top of the still. The condensed solvent cleaner or distillate flows down the upper section of the still wall into a circumferential trough 16 and then out of the still through an exit pipe 17 for reuse in the circuit board cleaning facility. Not all of the solvent cleaner is driven off but rather a good portion is mixed with the contaminates and forms a slurry 18 at the bottom of the tank portion of the still 12. The liquid slurry 18 is permitted to flow through a valve 19 into a metering device generally designated by the reference numeral 21. The metering device 21 is constructed to transfer precise charges of slurry to a pipe 22 running into a second distillation chamber 23.

Figure 2:
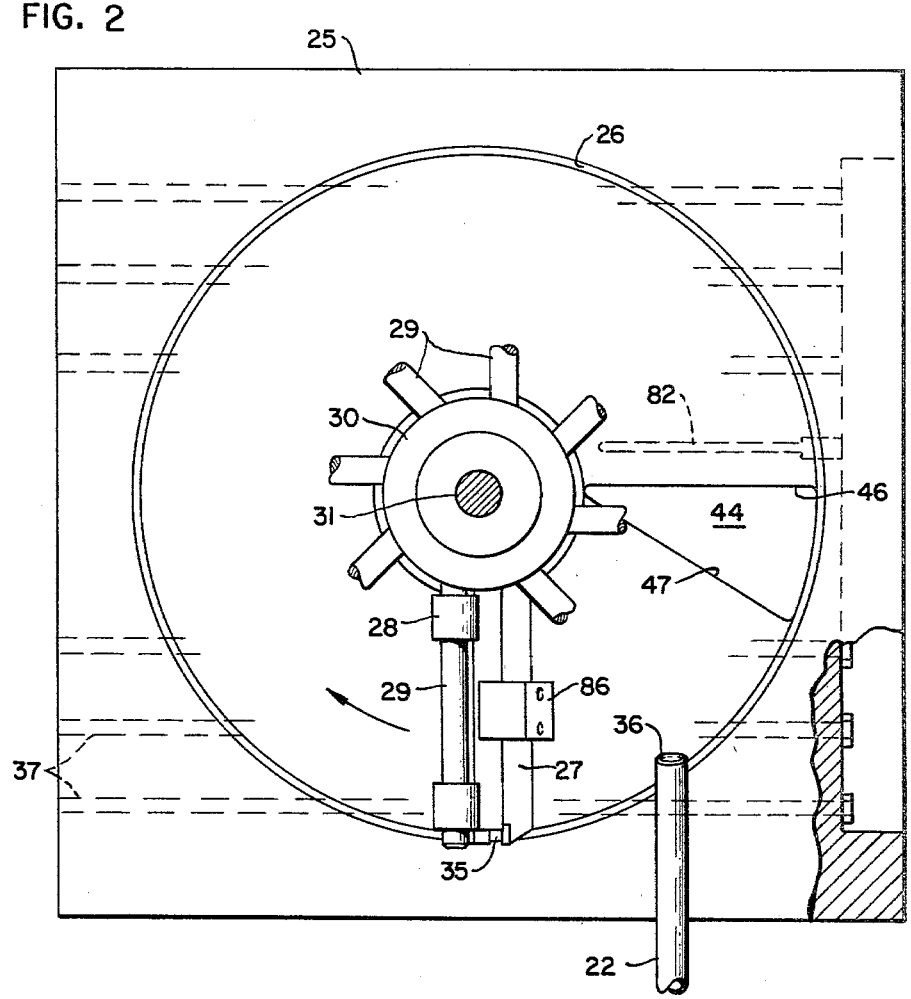
FIG. 2 is a top view of a hot plate and pusher device for heating and spreading metered charges of contaminated solvent slurry during a vaporization of the solvent.
Figure 3:
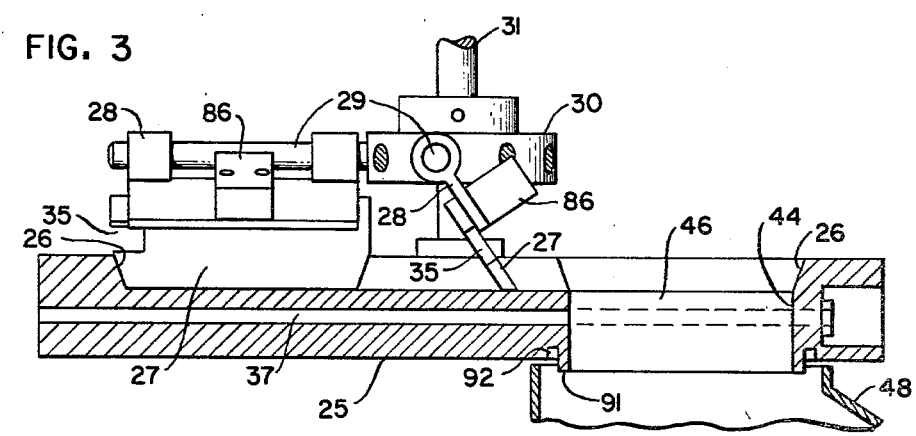
FIG. 3 is a side view partially in section of the hot plate and pusher shown in FIG. 2, and particularly showing the construction of a discharge chute for the residue slurry.

The second distillation chamber 23 comprises a tank 24 having a metallic plate or block 25 mounted therein. The plate is formed with an annular trough 26 having outwardly beveled side walls into which the slurry is deposited as a distilland. A number of scraper blades or wipers 27 are secured pivotally through hinge members 28 to spokes 29 mounted in a hub 30 secured to a shaft 31 that is driven through a gear reduction mechanism 32 by a motor 33. The outer edges of the blades 27 are provided with slots 35 to accommodate an inlet end 36 of the slurry delivery pipe 22. The lower sections of the blades 27 are beveled at the edges and shaped to conform to the shape of the trough 26 and act to spread and distribute each metered charge of slurry along the trough 26 so that heating elements 37 within the block 25 are effective to vaporize the residual solvent in the contaminated slurry mix. As shown in FIGS. 2 and 3, the blades 27 cooperate with the trough 26 to form a series of eight enclosed compartments of equal volume for receiving successive charges of slurry from the metering device 21.

The heated solvent vapors again rise and are condensed as distillate in the upper portion of the still 23 by the action of cooling coils 38. The condensed solvent runs down the sides of the upper portion of the tank 24 into a collection trough 39. The trough 39 extends around the circumference of the inner wall of the tank 24 and communicates with an exit pipe 41 which returns the condensed solvent to the first still 12. The returned condensed solvent is re-distilled or reboiled and collected in the trough 16 for transfer to the exit pipe 17. The residual slurry is pushed by the blades 27 (see also FIGS. 2 and 3) in to a slot or exit port 44 formed in the bottom of the trough to extend through the plate 25. It will be noted that the slot 44 is formed with a radial wall 46 and an intersecting chordal wall 47. As the devaporized solvent charge moves over the edge of the slot 44, the blade 27 will be supported by the beveled edges riding on the beveled edges of the trough 26, and the charge will immediately drop into a conduit 48 running to a receiving barrel 50. The chordal angular arrangement of the edge of the wall 47 acts on along the bottom edge of the rotating blade to wipe any slurry that may be clinging to the blade into the slot 44.

As the residual slurry passes down a conduit 48, it is further heated by coils 49. The slurry advanced into a receiver barrel or drum 50 is hot enough to further vaporize any solvent cleaner that still remains mixed in the slurry. The vaporized solvent cleaner is exited through a vent 51 into a pipe or tube 52 which runs back into the second still 23. The vapors emanating from pipe 52 rise in the still 23 and are condensed by the coils 38. The condensed liquid solvent distillate is again collected by the trough 39 and fed by the pipe 41 back into the first still 12.

Figure 4:
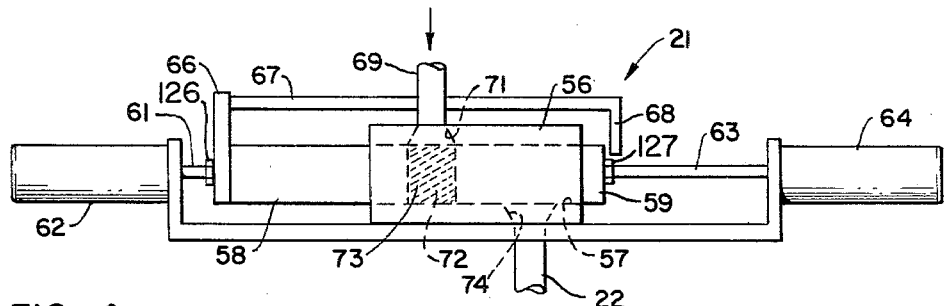
FIGS. 4, 5, 6 and 7 are side views of a pumping device in various stages of operation for delivering metered charges of a solvent containing slurry from a first distillation chamber to a second distillation chamber.

Referring now to FIGS. 4-7 for a more detailed consideration of the metering device 21, the metering device includes a block 56 having a transverse bore 57 to receive a pair of pistons 58 and 59. Piston 58 is screw thread attached to a piston rod 61 extending to a piston contained in a fluid cylinder 62. In a like manner, the piston 59 is screw thread connected by a piston rod 63 to a piston contained in a fluid cylinder 64. Secured to piston rod 61 is a bracket 66 connected to a rod 67 having an actuator bar 68 depending therefrom to engage the piston 59. The slurry mix passing through the valve 19 (shown in FIG. 1) passes through a pipe 69 that terminates in an input opening 71 formed in the block 56. As shown in FIG. 4, the pistons 58 and 59 are positioned so that their front faces are spaced apart to form a cavity or chamber 72 to receive a charge of slurry 73.

Figure 5:
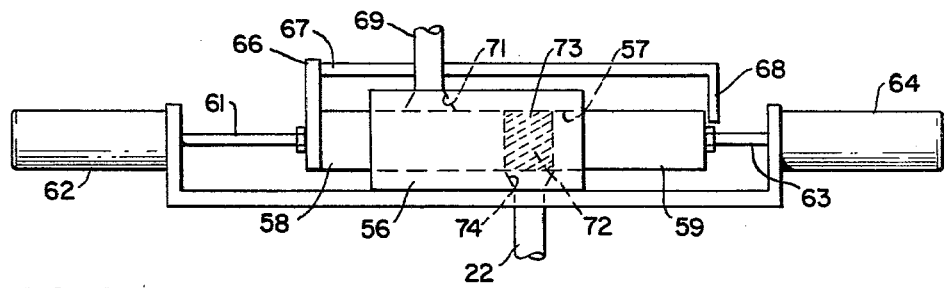

In operation, as disclosed in FIG. 5, the admission of fluid to the cylinder 64 drives the piston rod 63 and the piston 59 toward the right. In this instance the driving fluid for the piston 62 is relieved so that the piston 59 acts against the actuator bar 68 and pulls the bracket 66 and the piston 58 toward the right. The charge 73 is delivered to an entrance orifice or port 74 connected to the pipe 22. The piston rod 63 moves to the right until the piston attached thereto can no longer move further into the cylinder 64, whereafter the cylinder 62 receives fluid to drive the piston rod 61 and piston 58 toward the right to compress and force the charge 73 from the now collapsing chamber 72 into the exit pipe 22, see FIG. 6.

Figure 6:
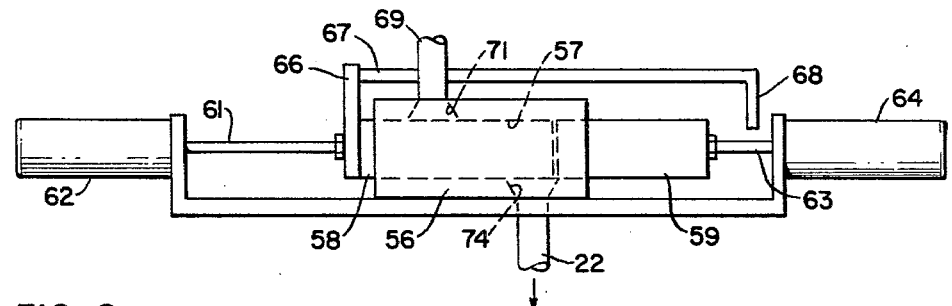
Figure 7:
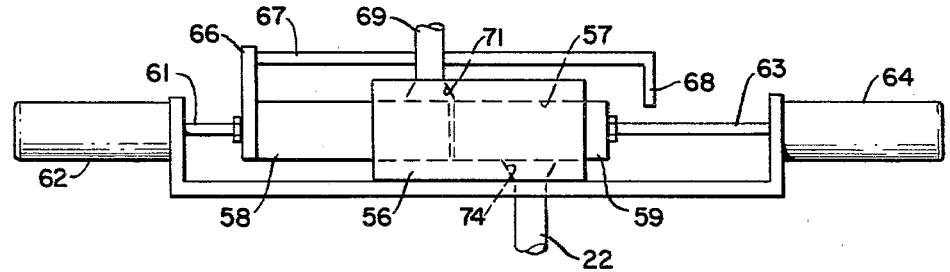

Following discharge of the metered slurry charge, the fluid cylinder 62 is deactivated and the fluid cylinder 64 is actuated to drive the piston 59 toward the left. Inasmuch as the applied fluid is relieved from the cylinder 62, the advancing piston 59 engages and moves the piston 58 toward the left as depicted in FIGS. 6 and 7. The cylinder 62 is then reactivated to further withdraw the piton rod 61 which pulls the face of the piston 58 from the face of the piston 59 to reform the cavity 72 to draw another charge 73 into the cavity 72. This movement of the piston rod 61 is also transmitted through the brackets 66, the rod 67 and the actuator bar 68 to move and reengage the bar 68 with the trailing extremity of the piston 59 so as to reposition these elements in the original position shown in FIG. 4.

An examination of FIGS. 2 and 3 discloses a number of parallel heating elements 37 extending through the block 25. In order to control the heating effect, a thermocouple 82 is positioned adjacent the discharge slot 44. This positioning of the thermocouple is selected to be at the point where the slurry is at its highest temperature. It is important to control the heating of the slurry because excess heat may cause the slurry to char and form toxic gases. The heat controller is graphically displayed in FIG. 1 and denoted by the reference numeral 83. This device may be one of many commercially available devices that measure temperature and accordingly control the energization of heating elements, such as heating elements 37.

The controls for the cyclic operation of metering device 21 are not shown inasmuch as many controllers are commercially available which may be set or programmed to deliver precise, discrete charges at a rate to insure the vaporization of residual solvent as the slurry mix is advanced along the trough. With various solvents to be treated, the controller for the metering device 21, the heat controller 83 and the controller for the motor 33 are set to insure that there is a maximum recovery of solvent without charring of the slurry, and with the production of a minimum amount of waste going into the receiving barrel.

As previously noted, each of the blades 27 is provided with a slot or notch 35 into which projects the terminal end 36 of the pipe 22. The slurry mix exiting from the pipe terminal 36 drops into the trough 26 at a point spaced from an outer beveled wall of the trough. The blade 27 thus immediately acts on and spreads the slurry over the entire width of the bottom of the trough. Each one of the blades 27 has mounted thereon on a weight 86 which functions to urge the blade 27 into the bottom of the trough 26 and into the hole 44. Each pair of adjacent blades cooperate with the bottom and side walls of the trough to form a series of distillation compartments of equal volume where each delivered discrete charge is reboiled as the charge is advanced toward the exit slot 44. The blade 27 may be made of low friction plastic material such as Teflon fluorocarbon resin sold by E. I. DuPont de Nemours and Co.

The upper end of the exit conduit 48 is shaped to generally conform to the shape of the hole 44 and is positioned in close proximity to the underside of the plate 25 (see FIG. 3) about a drip lip comprising a downwardly exxtending ring section 91 and an undercut circumferential slot 92. As the slurry moves down the slot 44 it will run to the depending end of the ring 91 and drop into the conduit 48 rather than run along the underside of the plate 25. The undercut 92 further insures against the working back of any of the slurry along the underside of the plate.

Figure 8:
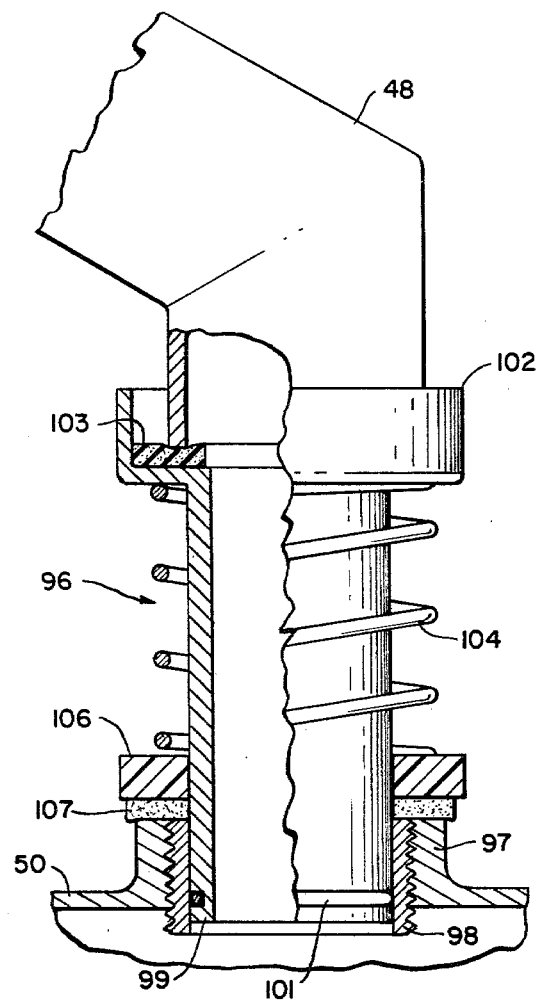
FIG. 8 is a side elevational view partially cut away to show the construction of a fitting for interconnecting a conduit running from the second distillation chamber to a residue receiving barrel.

The conduit 48 as shown in FIG. 8 terminates in a fitting 96 attached to the top of the receiving barrel 50. An internally treated boss 97 is secured about a hole formed in the top of the receiving barrel 50. An externally threaded bearing 98 is screwed into the boss 97. Slidably mounted within the bearing 98 is a pipe 99 having one or more circumferential slots for receiving one or more O-rings 101. The upper portion of the pipe 99 flanges outwardly to form a cup 102 into which is positioned a ring 103 of foam elastomer material. The circular end of the conduit 48 rests against and is sealed by the foam ring 103. The flange portion of the pipe 99 is supported by a spring 104 which rests on a ring 106 of low friction material, such as Teflon fluorocarbon resin. Interposed between the ring 106 and the top of the boss 97 is a second ring 107 of foam elastomer material. The weight of the conduit 48 acting on the cup 102 forces the spring 104 against the ring 106 to compress the ring 107 and, thus, seal the fitting 96 from the atmosphere.

Figure 9:
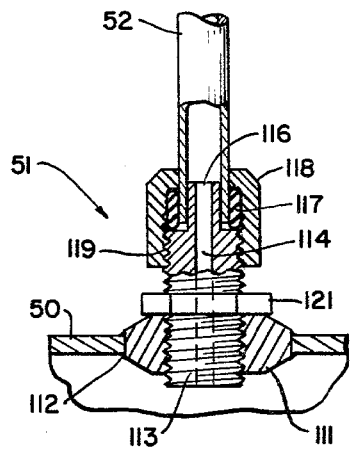
FIG. 9 is a side elevational view partially cut away to show the construction of a venting fitting interconnecting the residue barrel and a pipe running back to the second distillation chamber.

Referring to FIG. 9 for a consideration of the vent fitting 51 for exiting solvent fumes from the barrel 50 to the pipe 52, there is shown a collar 111 welded about a hole 112 formed in the top of the barrel 50. The collar 111 is internally threaded to receive an externally threaded union 113. Union 113 is provided with an internal passageway 114 which runs up through a projecting section 116 over which the end of the pipe 52 is fitted. Positioned about the lower end of the pipe is a ferrule 117 constructed of a compressible elastomer material. A cap 118 having an inwardly projecting flange with internal threads 119 is fitted over and screwed onto the threaded union 113 to compress the ferrule 117 to vapor seal the junction between the end of the pipe 52 and the top of the union 113. The fitting 51 is locked in position by means of a lock nut 121 which may be threaded down to jam against the top of the collar 111.

Upon a filling of a barrel with residual slurry, the operation of the metering device 21 is interrupted and the attending operator unscrews the cap 118 to disconnect the pipe 52 from the barrel 50. The attending operator depresses the cup 102 to free the end of the conduit 48 from the fitting 96 while an associate operator moves the barrel 50 from beneath the end of the conduit 48 and replaces it with an empty one.

The charge delivered by the metering device shown in FIGS. 4–7 may be changed by adjusting the positions of the piston rods 61 and 63 relative to the pistons 58 and 59. This is accomplished by providing the ends of the piston rods with screw threads which are received in threaded bores formed in the bar 66 and the back end of the piston 59, respectively. By releasing one or the other of a pair of lock nuts 126 and 127, the associated piston rod may be turned and moved in or out relative to the piston to vary the size of the cavity 72.

In brief summary, contaminated solvent cleaner is initially distilled in the tank 12, the residual slurry mix 18 of solvent and contaminates is passed through the valve 19 to the metering device 21 which cyclically operates to deliver metered amounts of slurry into the bottom of the trough 26. The compartments defined by the blades 27 are rotated in conjunction with the metering device so that a blade 27 pushes each metered charge around the trough into the exit opening 44. As the metered charge is moved, the heated plate 25 functions to reboil or vaporize residual solvent which rises and is condensed in the top of the second still 23. The condensed vapors are collected in trough 39 and fed by pipe 41 back into the first distillation chamber. The non-vaporized slurry which is substantially pure waste material at this time is dropped into the conduit 48. The heat applied to the plate 25 is controlled so that the slurry does not char but rather passes as a viscous liquid through the conduit 48. Heating coils 49 further heat the slurry as it drops into the receiving barrel 50. This further heating action will drive off any residual cleaner solvent from the slurry as a vapor which passes back up conduit 48 or through fitting 51 to the pipe 52 and, thus, back into the second still 23. The use of the aforedescribed method and apparatus insures that practically all of the contaminants are removed from the solvent cleaner, leaving only a minimum volume of residue which is substantially all waste and which may be readily disposed of.

What is claimed is:

1. An apparatus for distilling a mixture of volatile solvent and contaminants, which comprises:

a first still means for distilling the mixture to drive off a substantial portion of the solvent while accumulating a slurry mix of residual solvent and contaminants;

a second still means having an exit port and having a plurality of enclosed reboiler compartments, each of substantially the same volume, for receiving and heating a charge of slurry mix to drive off residual solvent leaving a residue of contaminants;

means for cyclically transferring precise discrete charges of slurry mix from the first still means to only one of successive ones of said compartments in the second still means; and means for moving said compartments to receive and advance each discrete charge of slurry mix through the second still means while the solvent is driven off and the contaminants are delivered to the exit port.

2. An apparatus for distilling a mixture of volatile solvent and contaminants, which comprises:

a first distillation chamber for heating the solvent, condensing the vapors, and flowing the distillate from the chamber while accumulating a residue slurry mix of contaminants and non-vaporized solvent;

a second distillation chamber having a heated plate with an annular trough formed therein, said chamber having means cooperating with said trough for forming a plurality of enclosed compartments of substantially equal volumes;

metering means for cyclically feeding discrete charges of predetermined volume of slurry from the first chamber to the trough and within only one of successive ones of said compartments formed in the second distillation chamber;

means for advancing the compartments to receive and spread each discrete charge of the slurry along the trough as the heated plate vaporizes the solvent in the slurry;

means for condensing the solvent vapors in the second chamber and feeding distillate back into the first chamber;

said trough having an exit opening formed therein to receive the heated devaporized slurry from each advanced compartment;

a receiving vessel having a vent;

conduit means for conveying the slurry to said receiving vessel;

means for heating the conduit to vaporize any solvent still contained in the slurry; and tube means connected to said vent for flowing vapor from the receiving vessel back into the second distillation chamber.

3. An apparatus as defined in claim 2, wherein the metering means comprises:

a block with a central bore extending therethrough, an entrance bore communicating to said central bore for receiving slurry from the first distillation chamber, and an exit bore for passing the slurry to the second distillation chamber;

a pair of pistons slidably mounted in said central bore; and means for cyclically operating the pistons from positions spaced about the entrance bore to provide a slurry receiving chamber to positions spaced about the exit bore, and then moving one piston relatively to the other to collapse the receiving chamber and force the slurry through the exit bore.

4. An apparatus as defined in claim 3, wherein the cyclically operating means moves the pistons from the chamber collapsed positions about the exit bore to positions about the entrance bore, whereupon one piston is moved relative to the other to reform the receiving chamber while drawing another charge of slurry from the first distillation chamber into the receiving chamber.

5. An apparatus as defined in claim 2, which comprises:

a hub having a plurality of radiating spokes;

a plurality of blades each having a hinge section mounted on one of the spokes to define forward and rearward walls of said compartments; and means for rotating the hub to move the blades to advance each metered charge fed into each compartment of the second distillation chamber along the trough.

6. An apparatus as defined in claim 5, which includes:

said trough having beveled side walls;

means for forcing the blades down into the trough;

said blades having beveled lower side edges which conform to the beveled side walls of the trough; and said exit opening defined by a radial wall and a chordal wall which acts to wipe the blades being moved along and supported by the beveled walls of the annular trough.

7. An apparatus as defined in claim 2, which comprises:
a fitting interconnecting the conduit means and the receiving vessel, said fitting including a pipe slidably mounted in the top of the receiving vessel and having a cup-shaped section for seating the end of the conduit means.

8. An apparatus as defined in claim 7, which includes:
a spring interposed between the top of the receiving vessel and the underside of the cup-shaped section of the pipe for supporting the pipe; and
a ring of elastomer material positioned in the cup-shaped section for sealing the juncture of the end of the conduit means and the pipe.

9. An apparatus as defined in claim 2, wherein the vent includes:
a threaded union having a section projecting from the top thereof which is fitted within the end of the tube means;
a ferrule of elastomer material about the projecting section;
a cap having internal threads fitted on the union for forcing the ferrule against the juncture of the tubular means and the union; and
an internally threaded member mounted in the top of the barrel for receiving the bottom section of the union.

10. An apparatus for distilling a solvent contaminated with rosin and other heavy impurities, which comprises:
a first distillation tank having a first exit means near the top of the tank for passing distillate solvent and a second exit means at the bottom of the tank for passing a concentrated mixture of the solvent and the rosin along with the other heavy impurities;
a metering device comprising a chamber for receiving a metered amount of the concentrated mixture, said metering device having input means for receiving the concentrated mixture passed from the first distillation tank and output means for exiting discrete metered charges from said chamber;
means for cyclically shifting the chamber back and forth between the input and output means to deliver discrete metered charges of the concentrated mixture to the output means;
a second distillation tank having a plurality of enclosed redistillation compartments of substantially equal volume for individually receiving each of said metered charges of concentrated mixture;
a heated plate forming a bottom of said compartment for heating discrete charges of said concentrated mixture received in only one of said each compartments;
means for moving said compartments to receive and advance each of said discrete metered charges over said heated plate to drive off the residual solvent in each metered charge; and
means for condensing and passing the driven off residual solvent back into the first distillation tank.

11. An apparatus as defined in claim 10, wherein the plate is provided with an annular trough for receiving the metered charge and the charge moving means comprise a series of wipers to define said compartments, and means for rotating the wipers to move the compartments about an axis to move the wipers in the trough to advance each metered charge into the hole in the plate.

12. An apparatus for distilling and recovering the constituents of a mixture of a volatile solvent and contaminants, which comprises:
a first still including means for vaporizing and condensing the solvent while accumulating a liquid residue mixture of solvent and contaminants at the bottom of the first still;
a device for receiving and transferring a discrete metered charge for the residue mixture;
means for flowing the residue mixture from the first still to said transferring device;
a second still including a heated plate with a trough formed therein, said trough having an exit orifice;
means for flowing each metered amount of residue mixture from said transferring device to said trough;
means for cyclically operating said transferring device to deliver successive discrete metered charges into said trough;
a plurality of spreader blades mounted for movement along said trough, said spreader blades being equally spaced apart and cooperating with said trough to form a series of compartments of substantially equal volume;
means for moving the spreader members to advance each compartment to receive only one of each successive delivered discrete charge and then advance each discrete charge along said trough into said exit opening;
means for heating each advancing discrete charge to vaporize the solvent;
means within the second still for condensing said vaporized solvent; and
means for returning the condensed solvent to the first still.

13. A system for removing contaminants from a cleaning fluid, which comprises:
a plate with an annular-shaped trough formed therein;
a first distillation tank for distilling the cleaning fluid and collecting liquid contaminants at the bottom of the tank;
a metering device having an entrance opening and exit opening for compressing and transferring discrete metered charges of contaminant from the entrance opening to the exit opening;
means for flowing the liquid contaminant from the bottom of the first distillation tank to said entrance opening;
means for flowing the metered charges of liquid contaminant from the exit opening to the trough in said plate;
means for cyclically operating the metering device to transfer discrete charges of contaminant to the exit opening to flow said charges through said flowing means to deposit each charge in said trough;
a second distillation tank enclosing said plate for distilling the charges flowed into said trough;
a plurality of blades, each blade having a shape conforming to the shape of said trough, each adjacent pair of blades cooperating with the trough to define a plurality of compartments of equal volume to receive only one of each successive charge;

said plate having a discharge opening formed therein to extend in and across said trough at a position adjacent to but spaced from said discharge opening;

means for rotating said blades to move along said annular trough to advance each compartment to move each deposited discrete charge along a portion of said trough into said discharge opening; and means for delivering the distilled cleaning fluid from the second distillation tank back into the first distillation tank.

14. A method of recovering volatile cleaning fluid from a mixture of cleaning fluid and contaminants, which comprises:

distilling the mixture to drive off a substantial portion of the cleaning fluid while collecting a residue mixture of cleaning fluid and contaminants;

cyclically accumulating and delivering precise discrete, metered charges of said residue mixture;

receiving each delivered discrete metered charge and spreading said discrete metered charge over a heated surface to further drive off cleaning fluid while accumulating a second residue mixture, said receiving step including depositing each discrete charge into only one of a series of enclosed reboiler compartments of substantially equal volumes which are advanced to move and spread each metered charge;

returning the driven off cleaning fluid for further distillation along with the original mixture; and collecting the second residue mixture advanced over the heated surface.

15. A method for distilling a mixture of a volatile solvent and contaminants, which comprises:

initially distilling the mixture in a first still to recover a substantial portion of the solvent as a distillate while accumulating a slurry mix of contaminants and residual non-distilled solvent;

extracting a precise discrete charge of slurry from the first still;

compressing and transferring the precise discrete slurry charge onto a heated plate within a second still, said second still including a series of equally spaced rotary blades cooperating with said heated plate to form a plurality of compartments of equal volume wherein each transferred discrete charge is deposited in only a successive one of said compartments;

distilling the discrete charge on the plate and returning the distillate to the first still;

moving the compartments to move each discrete charge over the plate to facilitate vaporization of the solvent while moving the residual slurry to an exit;

flowing the residual slurry from the exit into a receiving vessel;

heating the flowing residual charge, and venting solvent vapors from the receiving vessel back into the second still.

16. A method as defined in claim 15, wherein the compressing and transferring operation comprises:

moving a pair of spaced pistons from a load position to an exit position whereat a first of the pistons is held while the second piston continues to move toward the first; and then moving the pistons back to the load position where the second piston is held while the first piston continues to move away from the second piston to forcibly draw another charge of slurry from the first still.

17. A method as defined in claim 15, wherein the step of moving the charge is accomplished by moving the blades and the compartments to advance the charge in each successive compartment along an annular trough formed in the plate; and the transferring step moves each discrete slurry charge into successive ones of said compartments and onto a position spaced from the walls of the trough.

18. A method of separating perchloroethylene from a mixture of perchloroethylene, rosin and other contaminants, which comprises:

placing the mixture in a first still to heat and vaporize a substantial portion of the perchloroethylene while collecting a liquid residue of perchloroethylene, rosin and other contaminants in the bottom of the still;

removing the liquid residue from the bottom of the first still and forming discrete charges of predetermined volume;

cyclically transferring the discrete charges into a trough formed in a plate contained in a second still, each of said discrete charges being transferred into only one of a succession of compartments of equal volumes, heating the plate to a sufficient temperature to vaporize another substantial portion of the perchloroethylene from the residue mixture without decomposing or charring the perchloroethylene, rosin and other contaminants;

condensing the perchloroethylene in the top portion of the second still;

returning the condensed perchloroethylene to the first still for further distillation;

moving the compartments with the discrete charges of residue mixture along the trough while the perchloroethylene is vaporized;

passing the non-vaporized residue mixture from the trough into a closed receiving receptacle;

heating the residue mixture as it passes from the trough into the receiving receptacle; and venting any perchloroethylene vapors in the receptacle back into the second still.

* * * * *